US011977898B2

(12) United States Patent
Rajagopalan et al.

(10) Patent No.: US 11,977,898 B2
(45) Date of Patent: May 7, 2024

(54) MITIGATING INFORMATION HANDLING SYSTEM (IHS) STARTUP LATENCY IN HOTELING ENVIRONMENTS DUE TO DRIVER AND FIRMWARE UPDATES

(71) Applicant: Dell Products, L.P., Round Rock, TX (US)

(72) Inventors: Vivekanandh Narayanasamy Rajagopalan, Bangalore (IN); Vivek Viswanathan Iyer, Austin, TX (US); Gokul Thiruchengode Vajravel, Bangalore (IN)

(73) Assignee: Dell Products, L.P., Round Rock, TX (US)

( * ) Notice: Subject to any disclaimer, the term of this patent is extended or adjusted under 35 U.S.C. 154(b) by 239 days.

(21) Appl. No.: 17/650,536

(22) Filed: Feb. 10, 2022

(65) Prior Publication Data

US 2023/0251869 A1 Aug. 10, 2023

(51) Int. Cl.
*G06F 8/65* (2018.01)
*G06F 8/61* (2018.01)
*G06F 9/4401* (2018.01)

(52) U.S. Cl.
CPC .............. *G06F 9/4411* (2013.01); *G06F 8/61* (2013.01); *G06F 8/65* (2013.01); *G06F 9/4416* (2013.01)

(58) Field of Classification Search
None
See application file for complete search history.

(56) References Cited

U.S. PATENT DOCUMENTS

| | | | |
|---|---|---|---|
| 10,409,625 B1* | 9/2019 | Suryanarayanan | G06F 8/656 |
| 11,240,109 B2* | 2/2022 | Andrews | H04L 41/0893 |
| 11,907,701 B2* | 2/2024 | Rajagopalan | G06F 8/63 |
| 2012/0017208 A1* | 1/2012 | Lussier | G06F 8/65 717/174 |
| 2013/0019241 A1* | 1/2013 | Leitz | G06F 9/45558 718/1 |
| 2020/0219036 A1* | 7/2020 | Decamp | H04W 4/021 |

* cited by examiner

*Primary Examiner* — Marina Lee
(74) *Attorney, Agent, or Firm* — Fogarty LLP

(57) ABSTRACT

Systems and methods for mitigating Information Handling System (IHS) startup latency in hoteling environments due to driver and firmware updates are described. In an embodiment, an IHS configured to: receive an indication of a selected one of a plurality of workspaces; in response to the indication, retrieve a list of driver or firmware updates corresponding to peripheral devices available in the selected workspace; identify a subset of driver or firmware updates among the list of driver or firmware updates based, at least in part, upon a comparison between the list of driver or firmware updates and a list of one or more drivers or firmware installed in the IHS; and initiate installation of the subset of one or more driver or firmware updates before the IHS arrives at the selected workspace.

20 Claims, 3 Drawing Sheets

MITIGATING INFORMATION HANDLING SYSTEM (IHS) STARTUP LATENCY IN HOTELING ENVIRONMENTS DUE TO DRIVER AND FIRMWARE UPDATES

FIELD

This disclosure relates generally to Information Handling Systems (IHSs), and, more specifically, to systems and methods for mitigating IHS startup latency in hoteling environments due to driver and firmware updates.

BACKGROUND

As the value and use of information continues to increase, individuals and businesses seek additional ways to process and store it. One option available to users is an Information Handling System (IHS). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated.

Variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

In modern enterprises, the term "hoteling" (or "office hoteling") refers to a practice where workers dynamically schedule their hourly, daily, or weekly use of office desks, cubicles, or rooms (e.g., a conference room), thus serving as an alternative to permanently assigned seating. Generally, employees access a reservation system to book a workspace before they arrive at work, which gives them freedom and flexibility to work where they want to.

SUMMARY

Systems and methods for mitigating Information Handling System (IHS) startup latency in hoteling environments due to driver and firmware updates are described. In an illustrative, non-limiting embodiment an IHS may include a processor and a memory coupled to the processor, the memory having program instructions stored thereon that, upon execution, cause the IHS to: receive an indication of a selected one of a plurality of workspaces; in response to the indication, retrieve a list of driver or firmware updates corresponding to peripheral devices available in the selected workspace; identify a subset of driver or firmware updates among the list of driver or firmware updates based, at least in part, upon a comparison between the list of driver or firmware updates and a list of one or more drivers or firmware installed in the IHS; and initiate installation of the subset of one or more driver or firmware updates before the IHS arrives at the selected workspace.

The indication may be received from a workspace booking service integrated into or in communication with a remote workspace management service. The list of driver or firmware updates may be retrieved form a peripheral management service integrated into or in communication with a remote workspace management service. Additionally, or alternatively, the list of driver or firmware updates may be retrieved, at least in part, based upon a workspace identifier corresponding to the selected workspace. Additionally, or alternatively, the list of driver or firmware updates may be retrieved, at least in part, based upon a model name or number of the IHS. Additionally, or alternatively, the list of driver or firmware updates may be retrieved, at least in part, based upon an Operating System (OS) of the IHS.

The one or more peripheral devices may include at least one of: a docking station, a keyboard, a mouse, a touchscreen, a touchpad, a trackpad, a trackball, a pen, a stylus, a tablet, a joystick, a game controller, a camera, a biometric sensor, an external Graphical Processing Unit (eGPU), a display, a projector, a printer, a scanner, a headset, or an external hard drive.

To initiate installation of the subset of one or more driver or firmware updates, the program instructions, upon execution, may cause the IHS to enforce a policy that identifies a time of the installation. The time may be selected based upon at least one of: a geographical location of the IHS, a posture of the IHS, or a power state of the IHS. Additionally, or alternatively, the time may be selected based upon a presence or proximity of a user with respect to the IHS. Additionally, or alternatively, the time may be selected based upon at least one of: a utilization of the IHS, or an application executed by the IHS.

The program instructions, upon execution, may cause the IHS to uninstall the subset of one or more driver or firmware updates after the IHS leaves the selected workspace. To uninstall the subset of one or more driver or firmware updates, the program instructions, upon execution, further cause the IHS to enforce a policy that identifies a time of the uninstallation. The time may be selected based upon at least one of: a geographical location of the IHS, a posture of the IHS, a power state of the IHS, a presence or proximity of a user with respect to the IHS, a utilization of the IHS, or an application executed by the IHS.

In another illustrative, non-limiting embodiment, a memory storage device may have program instructions stored thereon that, upon execution by an IHS, cause the IHS to: receive, from a client IHS, a selection of one of a plurality of workspaces; in response to the selection, retrieve a list of driver or firmware updates corresponding to peripheral devices available in the selected workspace; and transmit an indication of the list of driver or firmware updates to the client IHS before the client IHS arrives at the selected workspace, wherein the client IHS is configured to: identify a subset of driver or firmware updates among the list of driver or firmware updates based, at least in part, upon a comparison between the list of driver or firmware updates and a list of one or more drivers or firmware installed in the client IHS; and initiate installation of the subset of one or more driver or firmware updates.

To transmit the indication, the program instructions, upon execution, may cause the IHS to enforce a policy that identifies a time of the transmission. The client IHS may be further configured to initiate the installation in response to a detection of one or more of: a geographical location of the client IHS, a posture of the client IHS, a power state of the client IHS, a presence or proximity of a user with respect to the client IHS, a utilization of the client IHS, or an application executed by the client IHS.

In yet another illustrative, non-limiting embodiment, a method may include, in connection with a booking of a selected one of a plurality of workspaces, retrieving a list of one or more drivers or firmware corresponding to one or more peripheral devices available in the selected workspace, and, prior to arriving at the selected workspace, installing a subset of the one or more drivers or firmware, where the subset comprises a difference between the list of one or more drivers or firmware and a list of installed one or more drivers or firmware.

The method may also include installing the subset of the one or more drivers or firmware in response to detecting one or more of: a geographical location, a posture, a power state, a presence or proximity of a user, a level of utilization, or an application being executed. The one or more peripheral devices comprise at least one of: a docking station, a keyboard, a mouse, a touchscreen, a touchpad, a trackpad, a trackball, a pen, a stylus, a tablet, a joystick, a game controller, a camera, a biometric sensor, an eGPU, a display, a projector, a printer, a scanner, a headset, or an external hard drive.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity and have not necessarily been drawn to scale.

DETAILED DESCRIPTION

For purposes of this disclosure, an Information Handling System (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An example of an IHS is described in more detail below.

Figure 1:
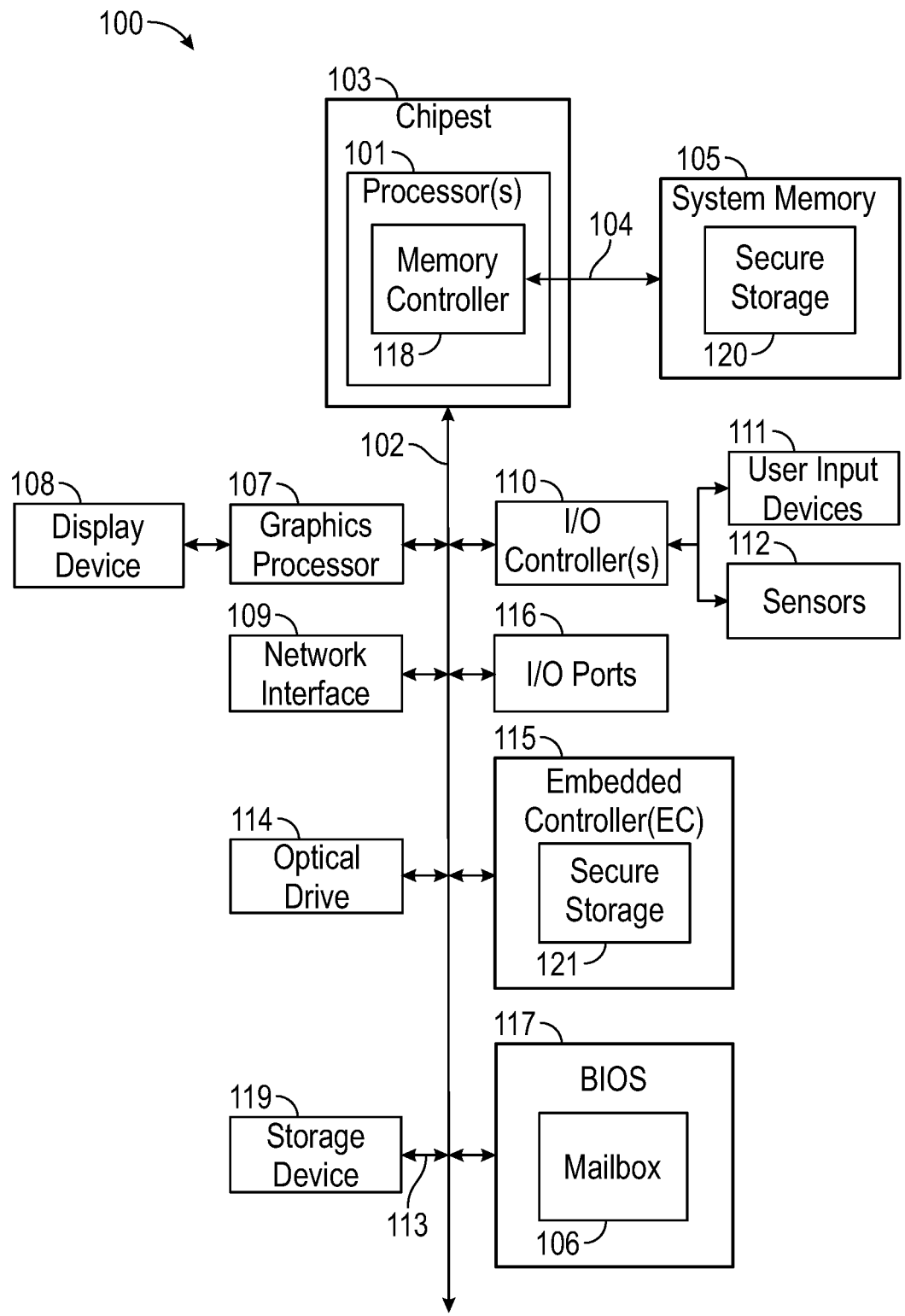
FIG. 1 is a diagram depicting examples of components of an Information Handling System (IHS), according to some embodiments.

FIG. 1 is a diagram depicting components of an example IHS 100 configured to mitigate startup latency in hoteling environments due to driver and firmware updates. As shown, IHS 100 includes one or more processor(s) 101, such as a Central Processing Unit (CPU), operable to execute code retrieved from system memory 105. Although IHS 100 is illustrated with a single processor, other embodiments may include two or more processors, that may each be configured identically, or to provide specialized processing operations.

Processor(s) 101 may include any processor capable of executing program instructions, such as an INTEL PENTIUM series processor or any general-purpose or embedded processors implementing any of a variety of Instruction Set Architectures (ISAs), such as the x86, POWERPC®, ARM®, SPARC®, or MIPS® ISAs, or any other suitable ISA. In the embodiment of FIG. 1, processor(s) 101 include an integrated memory controller 118 that may be implemented directly within the circuitry of processor(s) 101, or memory controller 118 may be a separate integrated circuit that is located on the same die as processor(s) 101. Memory controller 118 may be configured to manage the transfer of data to and from system memory 105 of IHS 100 via high-speed memory interface 104.

System memory 105 coupled to processor(s) 101 via memory bus 104 provides processor(s) 101 with a high-speed memory that may be used in the execution of computer program instructions by processor(s) 101. Accordingly, system memory 105 may include memory components, such as such as static RAM (SRAM), dynamic RAM (DRAM), NAND Flash memory, suitable for supporting high-speed memory operations. In some embodiments, system memory 105 may combine both persistent, non-volatile memory and volatile memory.

In certain embodiments, system memory 105 includes secure storage 120 that may be a portion of the system memory designated for storage of information, such as access policies, component signatures, encryption keys, and other cryptographic information, etc. In such embodiments, a signature may be calculated based on contents of secure storage 120 and stored as a reference signature. The integrity of the data stored in secure storage 120 may then be validated later by recalculating this signature of the contents of the secure storage and comparing the recalculated signature against the reference signature.

IHS 100 utilizes chipset 103 that may include one or more integrated circuits coupled to processor(s) 101. In the embodiment of FIG. 1, processor(s) 101 are depicted as component(s) of chipset 103. In other embodiments, all of chipset 103, or portions of chipset 108, may be implemented directly within the integrated circuitry of processor(s) 101. Chipset 103 provides processor(s) 101 with access to a variety of resources accessible via bus 102. In IHS 100, bus 102 is illustrated as a single element. However, other implementations may utilize any number of buses to provide the illustrated pathways served by bus 102.

As illustrated, a variety of resources may be coupled to processor(s) 101 of IHS 100 through chipset 103. For instance, chipset 103 may be coupled to network interface 109, such as provided by a Network Interface Controller (NIC) that allows IHS 100 to communicate via a network, such as the Internet or a LAN. Network interface device 109 may provide IHS 100 with wired and/or wireless network connections via a variety of network technologies, such as wireless cellular or mobile networks (CDMA, TDMA, LTE etc.), WiFi, and/or BLUETOOTH. In certain embodiments, network interface 109 may support connections between a trusted IHS component, such as Embedded Controller (EC) 115, and a remote or cloud service, or the like. In such embodiments, a connection supported by network interface 109 between the cloud service and EC 115 may be considered an out-of-band (OOB) connection that is isolated from any Operating System (OS) of IHS 100.

Chipset 102 may also provide access to one or more display device(s) 108 via graphics processor 107. In certain embodiments, graphics processor 107 may be part of one or more video or graphics cards/controllers, installed as components of IHS 100. Graphics processor 107 may generate display information and provide the generated information to one or more display device(s) 108 coupled to IHS 100.

Display device(s) 108 may include integrated display devices and/or external display devices coupled to IHS, such as via I/O port 116. In certain embodiments, graphics processor 107 may be integrated within processor(s) 101.

One or more display devices 108 coupled to IHS 100 may utilize Liquid Crystal Display (LCD), Light Emitting Diode (LED), organic LED (OLED), or other thin film display technologies. Each display device 108 may be capable of touch input such as via a touch controller which may be an embedded component of display device 108, graphics processor 107, or a separate component of IHS 100 accessed via bus 102.

In certain embodiments, chipset 103 may utilize one or more I/O controllers to access hardware components such as user input devices 111 and sensors 112. For instance, I/O controller 110 may provide access to user-input devices 110 such as a keyboard, mouse, touchpad, touchscreen and/or other peripheral input devices. User input devices 111 may interface with I/O controller 110 through wired or wireless connections. Sensors 112 accessed via I/O controllers 110 may provide access to data describing environmental and operating conditions of IHS 100 (e.g., accelerometers, gyroscopes, hinge sensors, rotation sensors, hall effect sensors, temperature sensors, voltage sensors, sensors, IR sensors, photosensors, proximity sensors, distance sensors, magnetic sensors, microphones, ultrasonic sensors, etc.).

In some cases, chipset 103 may include a sensor hub capable of utilizing information collected by sensors 112 in determining the relative orientation and movement of IHS 100. For instance, the sensor hub may receive data obtained by inertial movement sensors, including accelerometers, gyroscopes, and/or magnetometer sensors, and it may determine the orientation and movement of IHS 100 based, at least in part, on that data (e.g., IHS 100 is motionless on a relatively flat surface, IHS 100 is being moved irregularly and is likely in transport, the hinge of IHS 100 is oriented in a vertical direction).

In certain embodiments, the sensor hub may also include capabilities for determining a location and movement of IHS 100 based on triangulation of network signals and/or based on network information provided by the OS and/or network interface 109. In some embodiments, the sensor hub may support additional sensors, such as optical, infrared and sonar sensors, that may provide support for xR (virtual, augmented, and/or mixed reality) sessions hosted by IHS 100 and that may be used to provide an indication of a user's presence near IHS 100, such as whether a user is present, absent, and/or facing integrated display 108.

In cases where the end-user is present before IHS 100, the sensor hub may further determine a distance between the end-user and IHS 100, and such a determination may be made continuously, at periodic intervals, or upon request. These detected, calculated, or estimated distances may be used by processor(s) 101 to classify the user as being in IHS 100's near-field (user's position<threshold distance A), mid-field (threshold distance A<user's position<threshold distance B, where B>A), or far-field (user's position>threshold distance C, where C>B).

In embodiments where IHS 100 supports multiple physical configurations, such as a convertible laptop, N-in-1 device, or the like, the sensor hub may utilize one or more mode sensors 112 that collect readings usable to determine the posture in which IHS 100 is physically configured. In certain embodiments, posture determinations may be additionally made using movement and orientation information provided by sensors 112. In laptop and convertible laptop embodiments, for example, processor(s) 101 or EC 115 may utilize a lid position sensor 112 to determine the relative angle between the two panels of the laptop to determine the mode in which IHS 100 is physically configured. For example, the lid position sensor may measure the angle of rotation of the hinge that connects the base panel and lid panel of IHS 100. In some cases, processor(s) 101 or EC 115 may provide collected lid position information, such as the hinge angle, to the sensor hub for use in determining the posture in which IHS 100 is configured. Alternatively, the sensor hub may interface directly with the lid position sensor in determining hinge angle information.

The sensor hub may determine the posture of IHS 100 based, at least in part, on the angle of rotation of the hinge of IHS 100 from a closed position. A first range of hinge angles from a closed position may indicate a laptop posture, a second range of hinge angles may indicate a landscape posture and a third range of angles may indicate a tablet posture. The sensor hub may additionally utilize orientation and movement information collected from inertial movement sensors 112 to further identify the posture in which IHS 100 is physically configured.

For instance, if the sensor hub determines that IHS 100 is configured with a hinge angle characteristic of a laptop configuration, but IHS 100 is oriented on its side, IHS 100 may be determined to be in a book posture. Additionally, or alternatively, if IHS 100 is determined to be tilted such that the hinge is oriented between horizontal and vertical, the user's face is detected to be facing the integrated display, and IHS 100 is experiencing slight movement, the sensor hub may determine that IHS 100 is being used in the book posture.

The sensor hub may determine that IHS 100 is opened to a 180-degree hinge angle and lies on a flat surface, thus indicating that IHS 100 it is being used in a landscape posture. The sensor hub may similarly determine that IHS 100 is in a tent posture, in response to detecting a hinge angle within a defined range, such as between 300 and 345 degrees, and detecting an orientation of IHS 100 where the hinge is aligned horizontally and is higher than both display panels of IHS 100.

Other components of IHS 100 may include one or more I/O ports 116 for communicating with peripheral external devices as well as various input and output devices. For instance, I/O 116 ports may include HDMI (High-Definition Multimedia Interface) ports for use in connecting external display devices to IHS 100 and USB (Universal Serial Bus) ports, by which a variety of external devices may be coupled to IHS 100. In some embodiments, external devices coupled to IHS 100 via I/O port 116 may include storage devices that support transfer of data to and from system memory 105 and/or storage devices 119 of IHS 100. Access to storage devices via I/O port 116 may result in a change in a security profile of IHS 100.

Chipset 103 also provides processor(s) 101 with access to one or more storage devices 119. In various embodiments, storage device 119 may be integral to IHS 100, or may be external to IHS 100. In certain embodiments, storage device 119 may be accessed via a storage controller that may be an integrated component of the storage device. Storage device 119 may be implemented using any memory technology allowing IHS 100 to store and retrieve data. For instance, storage device 119 may be a magnetic hard disk storage drive or a solid-state storage drive. In some embodiments, storage device 119 may be a system of storage devices, such as a cloud drive accessible via network interface 109.

IHS 100 also includes BIOS (Basic Input/Output System) 117 that may be stored in a non-volatile memory accessible by chipset 103 via bus 102. Upon powering or restarting IHS 100, processor(s) 101 may utilize BIOS 117's instructions to initialize and test hardware components coupled to IHS 100. Upon execution, these instructions may facilitate the loading of an OS (e.g., WINDOWS, MACOS, iOS, ANDROID, LINUX, etc.) for use by IHS 100. BIOS 117 provides an abstraction layer that allows the OS to interface with hardware components of IHS 100. The Unified Extensible Firmware Interface (UEFI) was designed as a successor to BIOS. As a result, many IHS 100 may utilize UEFI in addition to or instead of a BIOS. As used herein, BIOS is intended to also encompass UEFI.

As illustrated, BIOS 117 may include a predefined memory or memory region that may be referred to as NVM (Non-Volatile Memory) mailbox 106. In such an implementation, mailbox 106 provides a secured storage location for use in storing access policies, signatures, cryptographic keys, or other data. For example, BIOS mailbox 106 may be utilized as a secure storage utilized by a cloud service (e.g., 204 of FIG. 2) to store configurations, settings, policies, and/or cryptographic keys for use in mitigating IHS startup latency due to driver and firmware updates in hoteling environments. BIOS mailbox 106 and secured storage 120 in system memory 105 may be utilized in this manner instead of, or in conjunction with, out-of-band functions implemented by EC 115.

EC 115 may be installed as a component of the motherboard of IHS 100. EC 115 may implement operations for interfacing with a power adapter in managing power for IHS 100. Such operations may be utilized to determine the power status of IHS 100, such as whether IHS 100 is operating from battery power or is plugged into an AC power source. Firmware instructions utilized by EC 115 may be used to operate a secure execution environment that may include operations for providing various core operations of IHS 100, such as power management and management of certain modes of IHS 100 (e.g., turbo modes, maximum operating clock frequencies of certain components, etc.).

IHS 100 may support the use of various power modes. In some embodiments, the power modes of IHS 100 may be implemented through operations of EC 115 and/or the OS of IHS 100. In various embodiments, IHS 100 may support different reduced power modes to reduce power consumption and/or conserve battery power when IHS 100 is not actively in use, and/or to control a level of performance available to the user by increasing or decreasing a maximum operating clock frequency of a component of IHS 100 (e.g., processor(s) 101).

For example, in some implementations, a low-power mode of operation may include the S0 low-power idle model, also known as Modern Standby or Connected Standby, which provides an instant on/off user experience and maintains a network connection for certain processes while consuming very little power. These power modes may be entered, for example, when IHS 100 transitions into standby (e.g., "sleep," etc.).

EC 115 may implement operations for detecting certain changes to the physical configuration of IHS 100 and managing the modes corresponding to different physical configurations of IHS 100. For instance, where IHS 100 is a laptop computer or a convertible laptop computer, EC 115 may receive inputs from a lid position sensor 112 that may detect whether the two sides of the laptop have been latched together to a closed position. In response to lid position sensor 112 detecting latching of the lid of IHS 100, EC 115 may initiate operations for shutting down IHS 100 or placing IHS 100 in a low-power mode.

EC 115 may be additionally configured to calculate signatures that uniquely identify individual components of IHS 100. In such scenarios, EC 115 may calculate a hash value based on the configuration of a hardware and/or software component coupled to IHS 100. For instance, EC 115 may calculate a hash value based on all firmware and other code or settings stored in an onboard memory of a hardware component, such as a network interface 109. Such hash values may be calculated as part of a trusted process of manufacturing IHS 100 and may be maintained in the secure storage 121 as a reference signature.

EC 115 may be further configured to recalculate a hash value later for such a component. The hash value recalculated for the component may then be compared against the reference hash value signature to determine if any modifications have been made to a component, thus indicating the component has been compromised. In this manner, EC 115 may be used to validate the integrity of hardware and software components installed on IHS 100.

In some cases, secure storage 121 may be utilized by a cloud service (e.g., 204 of FIG. 2) to store configurations, settings, policies, and/or cryptographic keys for use in mitigating IHS startup latency due to driver and firmware updates in hoteling environments.

In various embodiments, IHS 100 may not include all the components shown in FIG. 1. In other embodiments, IHS 100 may include other components in addition to those that are shown in FIG. 1. Furthermore, some components that are represented as separate components in FIG. 1 may instead be integrated with other components. For example, all or a portion of the operations executed by the illustrated components may instead be provided by components integrated into processor(s) 101 as systems-on-a-chip. As such, in certain embodiments, IHS 100 may be implemented as different classes of computing devices including, but not limited to: servers, workstations, desktops, laptops, appliances, video game consoles, tablets, smartphones, wearables (e.g., smart watches), etc.

As noted above, the practice of hoteling typically involves having workspaces (e.g., desks, cubicles, conference rooms, offices, etc.) available for employees, workers, clients, or users (hereinafter "hoteling users" or "users") to reserve or claim in advance, or throughout the workday, instead of traditional permanent seating. In some implementations, a workspace may include its own distinct set of peripheral devices (e.g., keyboards, mice, touchscreens, touchpads, trackpads, trackballs, pens, tablets, joysticks, webcams, digital camcorders, scanners, biometric sensors, displays, projectors, TVs, printers, plotters, speakers, microphones, headsets, external hard drives, media card readers, digital mixers, MIDI equipment, etc.) available to users.

In some cases, when a user arrives at a workspace, their IHS may be coupled to one or more peripheral devices via a Workspace Managing Device (WMD) such as a dock, docking station, intelligent hub, external display, wireless KVM, or other IHS. Additionally, or alternatively, a user's IHS may be directly coupled to one or more peripheral devices using any suitable wireless communication protocol (e.g., BLUETOOTH or "BT," BLUETOOTH LOW ENERGY or "BLE," ZIGBEE, Z-WAVE, WI-FI, WI-FI DIRECT, etc.).

A typical hoteling user may access several different workspaces each day. To do that, the user may access a workspace management portal that allows them to select and book workspaces for a given time and duration. Based on the nature of their work, a user may reserve a workspace that has peripheral devices sufficient to meet their needs. Because peripheral devices in each workspace vary, the drivers, firmware, and/or applications necessary for the user's IHS to operate those peripheral devices often need to be installed in the user's IHS (if absent) or updated (if a newer version of the driver, firmware, and/or application is available).

The installation or update of drivers and firmware applicable to peripheral devices in a selected workspace takes time, which can delay the start of the user's productive workspace session. For example, certain driver installations can take 20-30 minutes to download and install before the first use. Also, some drivers and firmware need at least one reboot to take effect post-installation. This results in a significant amount of time spent by end-users preparing their IHS before they can fully use the workspace they have reserved, which is herein referred to as "startup latency." Using systems and methods described herein, however, these downloads, installations, and/or updates may be performed in advance, rather than at the time when the user arrives at the workspace, thus mitigating (or eliminating) their startup latency.

Although the systems and methods described herein refer particularly to hoteling environments, it should be noted that similar techniques may be applied to other environments as well. For example, in a commercial use-case, a user may connect to a known but new workspace (e.g., an employee initiates a lab access request, and upon approval they may connect their IHS to the lab workspace and its peripheral devices). In a consumer/gaming use-case, a user may connect to a friend's "workspace" to play multi-player games using the peripheral devices available in that workspace.

As used herein, the term "driver," or "device driver," refers to a set of one or more files that instruct an IHS's OS (or other application how to communicate with a corresponding peripheral device. The term "firmware" refers to a set of one or more files that provide low-level control for a peripheral device's specific hardware, typically stored in read-only memory (ROM) or programmable read-only memory (PROM) embedded within the peripheral device itself. The term driver or firmware "update" refers to a modification to a previous version of a driver or firmware that corrects errors, including maintenance-only releases, bug fixes, and/or patch-kits. In contrast, a driver or firmware "upgrade" supersedes a previous version of a driver or firmware and is used for significant changes and major improvements. The term "update package" refers to a self-contained executable file that, upon execution, updates a driver or firmware in an IHS.

Figure 2:
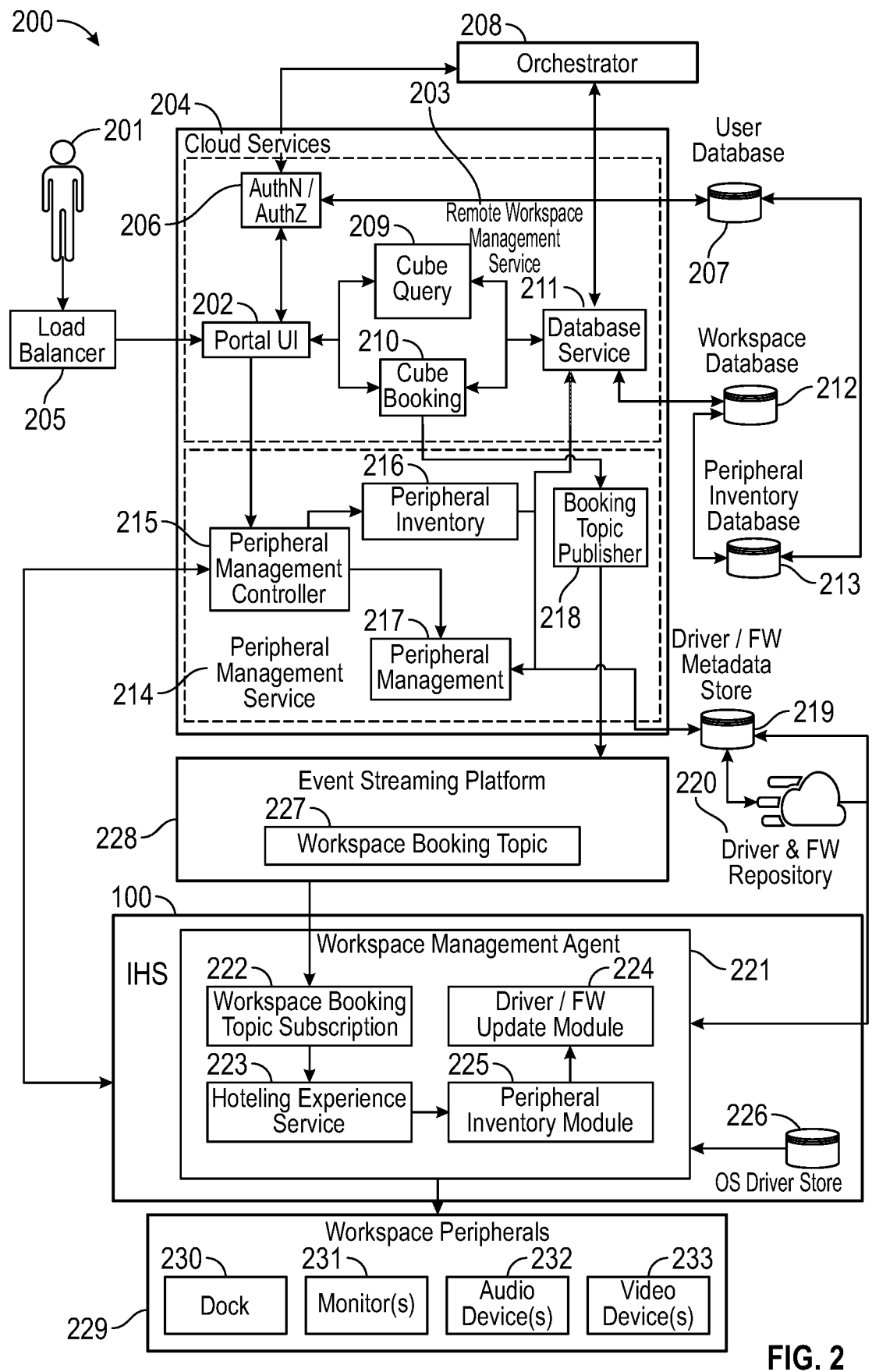
FIG. 2 is a diagram of an example of a system for mitigating IHS startup latency in hoteling environments due to driver and firmware updates, according to some embodiments.

FIG. 2 is a diagram of an example of system 200 for mitigating IHS startup latency in hoteling environments due to driver and firmware updates. In some embodiments, various components of system 200 may be instantiated, at least in part, through the execution of program instructions stored in one or more IHSs. For example, IHS 100 may be used as a client device. Cloud services 204, orchestration 208, and event streaming platform 228 may be implemented by different instances of IHSs (e.g., servers, etc.). Remote workspace management service 203 and peripheral management service 214 may be implemented by yet other IHSs. In operation, components of system 200 may perform method 300 (of FIG. 3) to provide IHS latency mitigation due to driver and firmware updates in hoteling environments.

In FIG. 2, user 201 (e.g., an employee, IT administrator, etc.) accesses cloud services 204 through load balancer or application gateway 205 (e.g., MICROSOFT AZURE, etc.). Within cloud services 204, workspace management service 203 may be configured to support workspace reservation or booking operations on behalf of remote workspace orchestrator 208, whereas peripheral management service 214 may be configured to support startup latency mitigation due to driver and firmware updates. In some implementations, peripheral management service 214 may integrated into workspace management service 203, for example, using appropriate Application Programming Interfaces (APIs), webhooks, or callbacks.

Within workspace management service 203, portal user interface (UI) 202 is coupled to load balancer 205 and to authentication service 206. Authentication service 206 is configured to receive credentials from user 201 through portal UI 202 and to consult user database 207 and/or remote workspace orchestrator 208 to perform one or more user authentication operations. Once authenticated, user 201 may access cube query service 209 to identify available workspaces and their respective peripheral devices, and/or cube booking service 210 to make workspace reservations. To obtain this information, cube query service 209 and cube booking service 210 may communicate with database service 211, which is coupled to workspace database 212 and peripheral inventory database 213.

Peripheral management service 214 includes peripheral management controller 215 coupled to peripheral inventory service 216 and peripheral management service 217. Peripheral management service 217 is coupled to driver/firmware metadata store 219 and to driver/firmware repository 220 (e.g., provided by an Original Equipment Manufacturer or "OEM" of IHS 100). Booking topic publisher 218 is coupled to cube booking service 210 and to workspace booking topic service 227 of event streaming platform 228.

Event streaming platform 228 may operate to capture data in real-time from event sources such as booking topic publisher 218, as well as other databases, sensors, mobile devices, cloud services, and/or software applications in the form of streams of events. Event streaming platform 228 may store these event streams durably for later retrieval, manipulate event streams in real-time (or retrospectively), and route event streams to different destinations based on publisher/subscriber mechanisms.

Workspace management agent 221 includes workspace booking topic subscription service 222 coupled to workspace booking topic service 227, hoteling experience service 223 coupled to workspace booking topic subscription service 222, and peripheral inventory module 225 coupled to hoteling experience service 223 and to driver/firmware update module 224.

Driver/firmware update module 224 is coupled to peripheral inventory module 225, driver/firmware metadata store 219, and driver/firmware repository 220. Driver/firmware metadata store 219 may include driver and firmware update metadata for a given IHS model name and number (workspaces may have different sets of connected peripherals and supported driver/firmware versions may be different for different IHS models or numbers). Peripheral inventory module 225 is also coupled to OS driver store 226.

Workspace 229 may be one of a plurality of available workspaces and it contains a specific set or one or more peripheral devices, such as docking station 230, display(s) 231, audio device(s) 232 (e.g., a headset), vide device(s) 233 (e.g., a webcam), etc. In some cases, workspace 299 may be a workspace selected by user 201 for subsequent use via remote workspace management service 203.

In operation, peripheral inventory service 216 provides an interface to query the inventory of peripheral devices connected to any given workspace, and it provides an interface for workspace management agent 221 to obtain updates for peripheral devices 230-233 when connected to workspace 229. Peripheral management service 217 includes logic for correlating drivers and firmware corresponding to the peripherals present in a workspace, and to return a list of drivers or firmware updates to be installed on IHS 100.

Peripheral management controller 215 works as a gateway service or entry point for managing calls to peripheral inventory service 216 and peripheral management service 217. It performs load balancing, routes the calls to the appropriate micro services, and returns responses. Booking topic publisher 218 publishes workspace booking messages from cube booking service 210 when user 201 reserves or cancels a workspace. Workspace management agent 221 may be an OS service subscribed to workspace booking topic service 227 and configured to prepare IHS 100 to use peripheral devices 230-233 in workspace 229, in many cases in anticipation of IHS 100 arriving at workspace 229.

Figure 3:
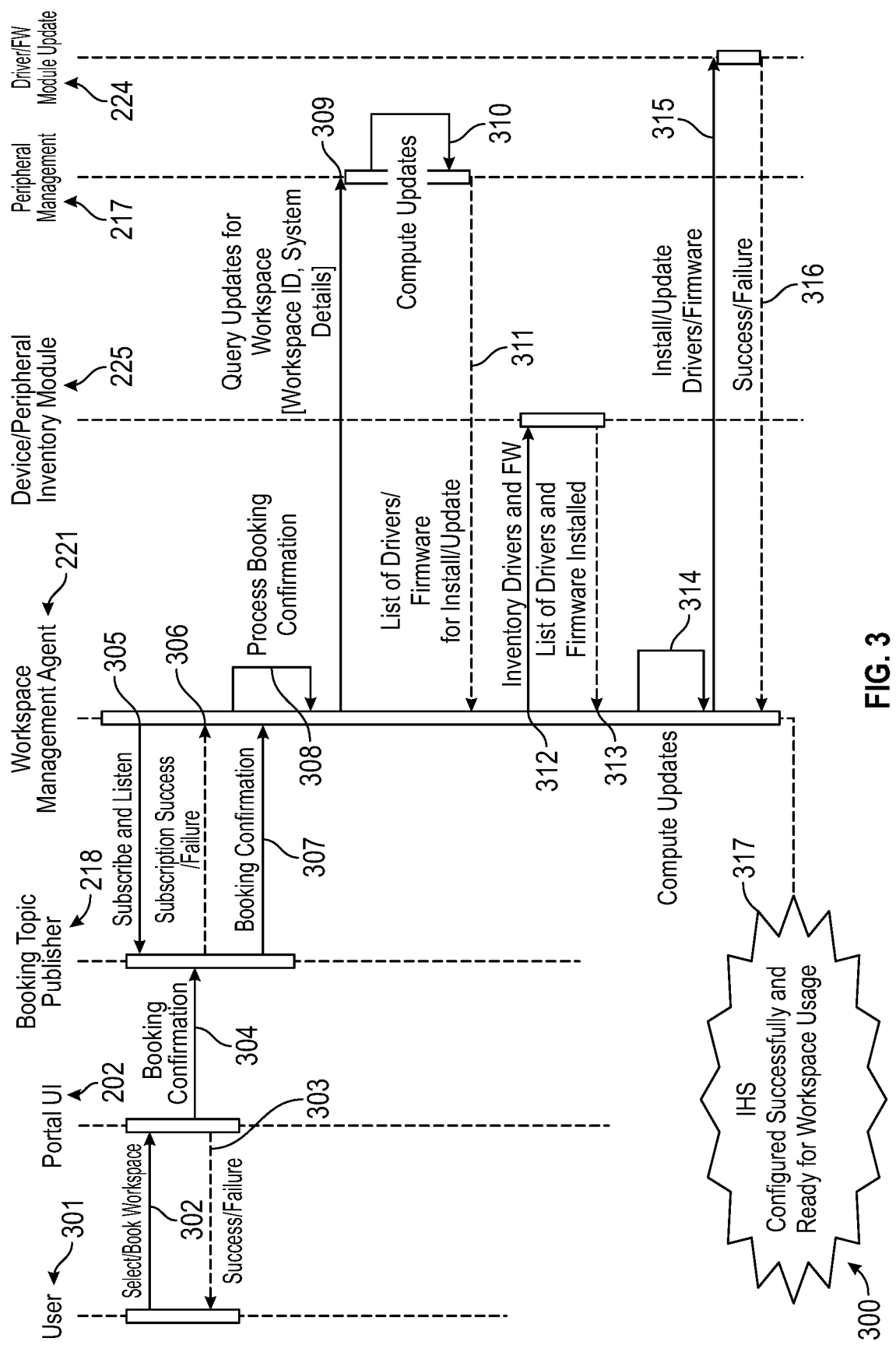
FIG. 3 is a flowchart of an example of a method for mitigating IHS startup latency in hoteling environments due to driver and firmware updates, according to some embodiments.

FIG. 3 is a flowchart of an example of method 300 for mitigating IHS startup latency in hoteling environments due to driver and firmware updates. In some embodiments, method 300 may be performed by workspace management agent 221 in cooperation with components of cloud services 204. At 302, user 301 of IHS 100 may access portal UI 202 to select and book/reserve a workspace. In some cases, user 301 may access portal UI 202 while operating IHS 100. At 303, portal UI 202 sends a success or failure response to user 301, and at 304 it sends a booking confirmation to booking topic publisher 218.

Workspace management agent 221 may be configured to pre-provision drivers and firmware corresponding to peripheral devices present in the selected, booked, or reserved workspace. Particularly, at 305 workspace management agent 221 may, upon its instantiation, subscribe to booking topic publisher 218 and listen to bookings corresponding to user 301 logged into IHS 100 intended to be used in the booked workspace. Booking topic publisher 218 may send a success or failure response to workspace management agent 221 at 306.

At 307, workspace management agent 221 receives a booking confirmation from booking topic publisher 218, and at 308 it processes the confirmation. At 309, workspace management agent 221 queries peripheral management service 217 for driver or firmware updates associated with peripheral devices present in the booked workspace. For example, workspace management agent 221 may send to peripheral management service 217: a workspace ID, a model name of IHS 100, a model number of IHS 100, a user ID, an OS name and version, and/or other contextual information (e.g., calendar information indicating a remote conference at the time of the workspace reservation, etc.).

At 310, peripheral management service 217 computes any updates applicable for the combination of: user, IHS, workspace, peripheral devices, application expected to use the peripheral devices, and/or context. At 311, peripheral management service 217 returns to workspace management agent 221 a first list of drivers or firmware available to install or update.

At 312, workspace management agent 221 queries peripheral inventory module 225 for drivers and firmware already installed on IHS 100, such that a second list is received at 313. At 314, workspace management agent 221 compares the second list against the first list to identify a subset of drivers and firmware in the first list that are not present in the second list and therefore should be installed or updated.

In some cases, installation of the subset of drivers and firmware may be initiated at a time defined by a policy, prior to IHS 100 arriving at the selected workspace, and in a manner that reduces the number of necessary reboots or interruptions. Moreover, the time of update or installation may be selected based upon at least one of: an expected time to complete the installation or update, a geographical location of IHS 100 (e.g., within a selected distance from the selected workspace), a posture of IHS 100, a power state of IHS 100, a presence or proximity of user 301 with respect to IHS 100, a utilization of IHS 100, an application executed by IHS 100, contextual information (e.g., calendar information), etc. Additionally, the policy may also prescribe a time at which driver or firmware may be uninstalled after IHS 100 leaves the selected workspace.

In some embodiments, method 300 may be used to handle unaccounted for peripheral devices present in the selected workspace. For example, workspace management agent 221 may detect unaccounted for peripheral devices nonetheless found at the booked workspace when IHS 100 arrives, and it may use peripheral inventory module 225 to perform an inventory update of driver and firmware version of the devices connected to that workspace. Workspace management agent 221 may then post the collected inventory data to peripheral management controller 215, which directs a post request to peripheral inventory service 216 for updating the inventory information in appropriate database(s).

As such, systems and methods described herein provide the ability to pre-install/update/provision a set of drivers and firmware for peripheral devices expected to be found in a reserved workspace. These systems and methods enable an end-user to use a reserved workspace without startup latency (otherwise caused by updates and installations being performed after the IHS connects to a workspace), thus reducing the user's time-to-productivity.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

The invention claimed is:

1. An Information Handling System (IHS), comprising:
   a processor; and
   a memory coupled to the processor, the memory having program instructions stored thereon that, upon execution, cause the IHS to:
      receive an indication of a selected one of a plurality of workspaces;
      in response to the indication, retrieve a list of driver or firmware updates corresponding to peripheral devices available in the selected workspace;
      identify a subset of driver or firmware updates among the list of driver or firmware updates based, at least in part, upon a comparison between the list of driver or firmware updates and a list of one or more drivers or firmware installed in the IHS; and
      initiate installation of the subset of one or more driver or firmware updates before the IHS arrives at the selected workspace.

2. The IHS of claim 1, wherein the indication is received from a workspace booking service integrated into or in communication with a remote workspace management service.

3. The IHS of claim 1, wherein the list of driver or firmware updates is retrieved from a peripheral management service integrated into or in communication with a remote workspace management service.

4. The IHS of claim 1, wherein the list of driver or firmware updates is retrieved, at least in part, based upon a workspace identifier corresponding to the selected workspace.

5. The IHS of claim 1, wherein the list of driver or firmware updates is retrieved, at least in part, based upon a model name or number of the IHS.

6. The IHS of claim 1, wherein the list of driver or firmware updates is retrieved, at least in part, based upon an Operating System (OS) of the IHS.

7. The IHS of claim 1, wherein the one or more peripheral devices comprise at least one of: a docking station, a keyboard, a mouse, a touchscreen, a touchpad, a trackpad, a trackball, a pen, a stylus, a tablet, a joystick, a game controller, a camera, a biometric sensor, an external Graphical Processing Unit (eGPU), a display, a projector, a printer, a scanner, a headset, or an external hard drive.

8. The IHS of claim 1, wherein to initiate installation of the subset of one or more driver or firmware updates, the program instructions, upon execution, further cause the IHS to enforce a policy that identifies a time of the installation.

9. The IHS of claim 8, wherein the time is selected based upon at least one of: a geographical location of the IHS, a posture of the IHS, a power state of the IHS.

10. The IHS of claim 8, wherein the time is selected based upon a presence or proximity of a user with respect to the IHS.

11. The IHS of claim 8, wherein the time is selected based upon at least one of: a utilization of the IHS, or an application executed by the IHS.

12. The IHS of claim 1, wherein the program instructions, upon execution, further cause the IHS to uninstall the subset of one or more driver or firmware updates after the IHS leaves the selected workspace.

13. The IHS of claim 12, wherein to uninstall the subset of one or more driver or firmware updates, the program instructions, upon execution, further cause the IHS to enforce a policy that identifies a time of the uninstallation.

14. The IHS of claim 13, wherein the time is selected based upon at least one of: a geographical location of the IHS, a posture of the IHS, a power state of the IHS, a presence or proximity of a user with respect to the IHS, a utilization of the IHS, or an application executed by the IHS.

15. A non-transitory computer readable storage medium having program instructions stored thereon that, upon execution by an Information Handling System (IHS), cause the IHS to:
   receive, from a client IHS, a selection of one of a plurality of workspaces;
   in response to the selection, retrieve a list of driver or firmware updates corresponding to peripheral devices available in the selected workspace; and
   transmit an indication of the list of driver or firmware updates to the client IHS before the client IHS arrives at the selected workspace, wherein the client IHS is configured to:
      identify a subset of driver or firmware updates among the list of driver or firmware updates based, at least in part, upon a comparison between the list of driver or firmware updates and a list of one or more drivers or firmware installed in the client IHS; and
      initiate installation of the subset of one or more driver or firmware updates.

16. The non-transitory computer readable storage medium of claim 15, wherein to transmit the indication, the program instructions, upon execution, further cause the IHS to enforce a policy that identifies a time of the transmission.

17. The non-transitory computer readable storage medium of claim 15, wherein the client IHS is further configured to initiate the installation in response to a detection of one or more of: a geographical location of the client IHS, a posture of the client IHS, a power state of the client IHS, a presence or proximity of a user with respect to the client IHS, a utilization of the client IHS, or an application executed by the client IHS.

18. A method, comprising:
   in connection with a booking of a selected one of a plurality of workspaces, retrieving a list of one or more drivers or firmware corresponding to one or more peripheral devices available in the selected workspace; and
   prior to arriving at the selected workspace, installing a subset of the one or more drivers or firmware, wherein the subset comprises a difference between the list of one or more drivers or firmware and a list of installed one or more drivers or firmware.

19. The method of claim 18, further comprising installing the subset of the one or more drivers or firmware in response to detecting one or more of: a geographical location, a posture, a power state, a presence or proximity of a user, a level of utilization, or an application being executed.

20. The method of claim 18, wherein the one or more peripheral devices comprise at least one of: a docking station, a keyboard, a mouse, a touchscreen, a touchpad, a trackpad, a trackball, a pen, a stylus, a tablet, a joystick, a game controller, a camera, a biometric sensor, an external Graphical Processing Unit (eGPU), a display, a projector, a printer, a scanner, a headset, or an external hard drive.

* * * * *